United States Patent [19]

Frances et al.

[11] Patent Number: 5,292,798
[45] Date of Patent: Mar. 8, 1994

[54] CYCLOPENTADIENYL AND/OR CYCLOPENTADIENYLENE AND/OR DICYCLOPENTADIENYLENE SUBSTITUTED POLYORGANOSILOXANES CROSSLINKABLE INTO ELASTOMERIC STATE

[75] Inventors: Jean-Marc Frances, Villeurbanne; Frederic Leising, Mornant, both of France

[73] Assignee: Rhone-Poulenc Chimie, Courvevoie, France

[21] Appl. No.: 876,523

[22] Filed: Apr. 30, 1992

[30] Foreign Application Priority Data

Apr. 30, 1991 [FR] France .................... 91 05648

[51] Int. Cl.$^5$ .................... C08K 3/08
[52] U.S. Cl. .................... 524/779; 524/789; 524/788; 524/783; 524/785; 524/780; 524/786; 524/858; 524/860; 528/14; 528/15; 528/17; 528/18; 528/19; 528/25; 528/32; 528/34
[58] Field of Search .................... 528/25, 32, 34, 14, 528/15, 19, 17, 18; 524/789, 788, 783, 785, 780, 779, 786, 858, 860

[56] References Cited

U.S. PATENT DOCUMENTS

| | | | |
|---|---|---|---|
| 2,957,901 | 10/1960 | Olson et al. | 260/448.2 |
| 4,645,850 | 2/1987 | Deschler et al. | 556/482 |
| 4,704,428 | 11/1987 | Deschler et al. | 524/535 |

FOREIGN PATENT DOCUMENTS

| | | |
|---|---|---|
| 0259711 | 3/1988 | European Pat. Off. |
| 0282927 | 9/1988 | European Pat. Off. |
| 0423688 | 4/1991 | European Pat. Off. |
| 0430827 | 5/1991 | European Pat. Off. |

*Primary Examiner*—Melvyn I. Marquis
*Attorney, Agent, or Firm*—Burns, Doane, Swecker & Mathis

[57] ABSTRACT

Cyclopentadienyl and/or cyclopentadienylene and/or dicyclopentadienylene-substituted polyorganosiloxanes that are crosslinkable into elastomeric state on exposure to atmospheric oxygen and/or to moisture are well suited, e.g., for adhesive applications in the construction industry and for diverse insulating/coating applications.

9 Claims, No Drawings

CYCLOPENTADIENYL AND/OR CYCLOPENTADIENYLENE AND/OR DICYCLOPENTADIENYLENE SUBSTITUTED POLYORGANOSILOXANES CROSSLINKABLE INTO ELASTOMERIC STATE

BACKGROUND OF THE INVENTION

Field of the Invention

The present invention relates to polyorganosiloxane polymers containing cyclopentadienyl and/or cyclopentadienylene and/or dicyclopentadienylene functional groups, the preparation of same and silicone compositions comprised thereof which are crosslinkable into elastomeric state, in particular by means of atmospheric humidity and/or atmospheric oxygen.

SUMMARY OF THE INVENTION

Briefly, the present invention features novel polyorganosiloxane polymers, whether a polyorganosiloxane ($P_1$) comprising, per molecule, at least one structural unit of the formula:

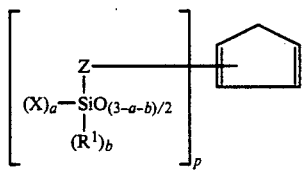
(1)

and/or a polysiloxane ($P_2$) comprising, per molecule, at least one structural unit of the formula:

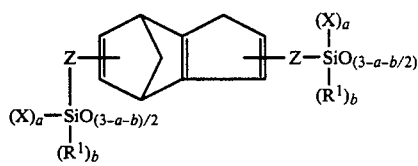
(1')

in which formulae the radicals X, which may be identical or different, are each a hydrolyzable group selected from among a halogen atom, an N-substituted amino, N-substituted amido, N,N-disubstituted amino, ketiminoxy, aldiminoxy, alkoxy, acyloxy, enoxy and alkoxyalkylenexy radical; the radicals $R^1$, which may be identical or different, are each a monovalent hydrocarbon radical having from 1 to 10 carbon atoms; Z is a straight or branched chain divalent saturated hydrocarbon radical having from 1 to 10 carbon atoms; a is zero, 1 or 2; b is zero, 1 or 2; a+b is at most 2; and p is 1 or 2, with the proviso that the polysiloxane ($P_1$) comprises, per molecule, at least one structural unit (1) if a differs from zero and at least two structural units (1) if a is zero.

DETAILED DESCRIPTION OF THE PREFERRED EMBODIMENTS OF THE INVENTION

More particularly according to the present invention, the aforesaid radicals $R^1$ are advantageously:

(i) alkyl and haloalkyl radicals having from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals;

(ii) cycloalkyl and halocycloalkyl radicals having from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(iii) alkenyl radicals having from 2 to 4 carbon atoms, such as vinyl, allyl and but-2-enyl radicals;

(iv) monocyclic aryl and haloaryl radicals having from 6 to 10 carbon atoms, such as phenyl, tolyl, xylyl, chlorophenyl, dichlorophenyl and trichlorophenyl radicals; and (v) cyanoalkyl radicals in which the alkyl moiety has from 2 to 3 carbon atoms, such as $\beta$-cyanoethyl and $\beta$-cyanopropyl radicals.

$R^1$ is preferably selected from among methyl, phenyl and vinyl radicals, at least 70% by number of such radicals $R^1$ being methyl radicals.

The polysiloxanes according to the present invention may optionally also include other siloxyl structural units corresponding to the formula:

$$(R^1)_c SiO_{(4-c)/2} \qquad (2)$$

in which $R^1$ is as defined above, and c is zero, 1, 2 and 3.

The polyorganosiloxanes according to the present invention may have a straight, cyclic or branched chain structure and are advantageously in the form of oils having a viscosity ranging from 1 to 1,000,000 mPa.s at 25° C., preferably from 100 to 500,000 mPa.s.

The polyorganosiloxanes according to the present invention comprise, for example:

(3) random, sequenced or block diorganopolysiloxane copolymers having the average formula:

(3)

in which Y represents the radical

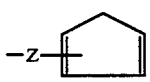

in which Z is as defined above; $R^1$ and X are as defined above; Y' is Y, $R^1$ or a hydroxyl radical; $R^8$ is an $R^1$ radical or an X radical; d is a number ranging from 0 to 1,000; e is an integer ranging from 0 to 50, with the proviso that, if e=0, the two radicals Y' are Y radicals, and those of formula (4):

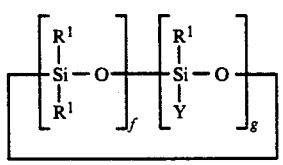
(4)

in which $R^1$ and Y are as defined above; f is an integer ranging from 0 to 9, inclusive, g is an integer ranging from 1 to 9, inclusive, and f+g ranges from 3 to 10, inclusive.

The polysiloxanes according to the present invention also comprise those having the formula:

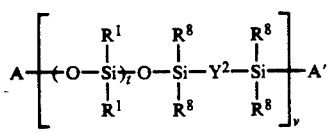  (3')

in which $Y^2$ is a group

with Z being as defined above; $R^1$ is as defined above; $R^8$ is an $R^1$ radical or an X radical, as defined above; A is a hydrogen atom, optionally replaced by group $R^{13}Si—$, with $R^1$ being as defined above, or a group:

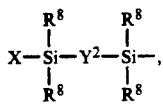

with $R^8$, $Y^2$ and X being as defined above; A' is a radical X, as defined above, or the group:

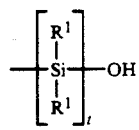

in which the hydrogen atom of the hydroxyl group may optionally be replaced by a group $R^{13}Si—$; t ranges from 5 to 1,000, inclusive; and v ranges from 1 to 200, inclusive.

The polyorganosiloxanes according to the present invention also comprise, for example, those according to formula (1) but not containing the hydrolyzable groups X. Exemplary of such polyorganosiloxanes are, in particular, those of the formula:

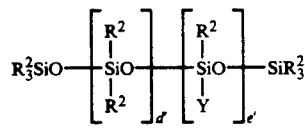  (3''')

in which Y is the group

in which Z is a hydrocarbon radical having from 1 to 10 carbon atoms and preferably 3 carbon atoms; the radicals $R^2$, which may be identical or different, are each a monovalent hydrocarbon radical having from 1 to 10 carbon atoms; d is a number ranging from 10 to 1,000; and e' is a number ranging from 2 to 50.

The polyorganosiloxanes according to formula (3'') may be prepared, for example, by reacting a polyorganosiloxane of the formula:

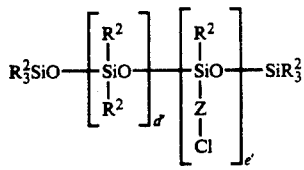

with cycopentadienyl-sodium of the formula

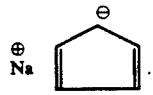

During this reaction, sodium chloride and the product of formula (3''), with $R^2$, d' and e' being as defined above, are formed. The cyclopentadienyl-sodium is a compound, the preparation of which is described, for example, in Examples I and II of U.S. Pat. No. 2,957,901.

The polyorganosiloxanes of formulae (1), (1'), (3) and (4) may be prepared by hydrolysis and polycondensation of silanes of the formula:

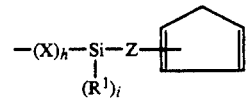  (5)

and/or silanes of the formula:

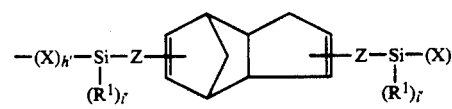  (5')

the silane of formula (5') being the dimer of the silane of formula (5), and/or silanes of the formula:

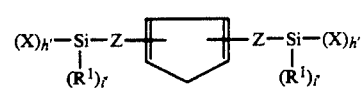  (5'')

optionally in the presence of a halosilane, preferably a chlorosilane of the formula:

$(R^1)_j(Cl)_k Si$   (6)

in which formulae Z is as defined above; $R^1$ is as defined above; X is as defined above and advantageously is an alkoxy group, preferably methoxy or ethoxy, or a halogen atom, preferably chlorine; h is 2 or 3; i is zero or 1; h+i=3; i' is zero, 1 or 2; h' is 1, 2 or 3; i'+h'=3; j is zero, 1, 2 or 3; k is 1, 2, 3 or 4; and j+k=4.

The use of the chlorosilanes of formula (6) makes it possible to incorporate structural units of formula (2) in the organopolysiloxane of formula (1). The polycondensation may be stopped simply by neutralizing the reaction mixture.

In the event that it is desired to obtain straight chain polymers of formula (3) or cyclic polymers of formula (4), for example, the dichlorosilane $R^1YCl_2Si$ is hydrolyzed and polycondensed, optionally with the dichlorosilane of formula $R^2{}_1SiCl_2$.

In the event that the polycondensation is stopped simply by neutralizing, a reaction mixture is obtained which contains polymers of formula (3) blocked at each of their ends by a hydroxyl group or by the $R^{12}YSiO_{0.5}$ unit if the silane $R^{12}YSiCl$ is also used at the start, the definitions of Y and $R^1$ being the same as those given above.

It is also possible to stop the polycondensation by adding, upon completion of the reaction, an organosilicon compound capable of reacting with the terminal hydroxyl groups of the polymer of formula (3) formed, such organosilicon compound advantageously having one of the formulae:

$R^{13}{}_3SiCl$, $R^{13}{}_3SiNHSiR^{13}{}_3$ and $R^{13}{}_3SiOSiR^{13}{}_3$.

The hydrolysis time may range from a few seconds to several hours.

After the hydrolysis, the aqueous phase is separated from the siloxane phase by any appropriate physical means, typically by settling out and extraction with an organic solvent such as isopropyl ether.

The siloxane phase may subsequently be washed with water and then distilled, if appropriate, in order to separate the straight chain polymers of formula (3) from the cyclic polymers of formula (4).

The polysiloxanes according to the present invention may also be prepared by reacting a polyorganosiloxane resin containing at least two hydroxyl groups and/or a polydiorganosiloxane oil having terminal hydroxyl groups with a silane of formula (5) and/or with a silane of formula (5′), said formulae having been indicated above, it being appreciated that the silane of formula (5′) is the dimer of the silane of formula (5). It has been determined that, depending on the reaction conditions, in particular in respect of temperature, and depending on the nature of the product, it was in fact possible to prepare:

(i)  the silane of formula (5) alone,
(ii) the silane of formula (5′) alone,
(iii) the silane of formula (5″) alone, or
(iv) a mixture of these silanes of formulae (5), (5′) and (5″).

The following are exemplary silanes of the formulae (5) and (5′):

Dimer

$(CH_3O)_3—Si—Y^4—Si(OCH_3)_3$ (A′)
which may also be indicated as

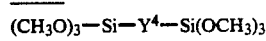
$\left[(CH_3O)_3—Si\right]_2—Y^4$ (A′)

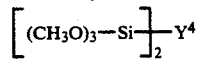
$\left[(CH_3O)_3—Si(CH_2)_3\right]_2—Y^4$ (B′)

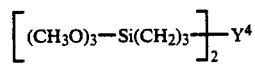
$\left[(CH_3—CH_2O)_3Si\right]_2—Y^4$ (C′)

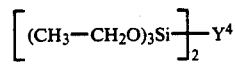
$\left[(CH_3—CH_2O)_2\underset{Me}{Si}\right]_2—Y^4$ (D′)

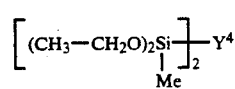

-continued

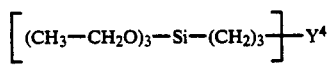
$\left[(CH_3—CH_2O)_3—Si—(CH_2)_3\right]_2—Y^4$ (E′)

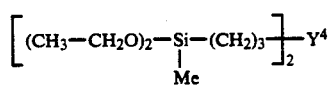
$\left[(CH_3—CH_2O)_2—\underset{Me}{Si}—(CH_2)_3\right]_2—Y^4$ (F′)

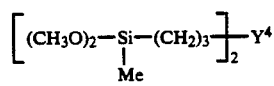
$\left[(CH_3O)_2—\underset{Me}{Si}—(CH_2)_3\right]_2—Y^4$ (G′)

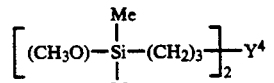
$\left[(CH_3O)—\underset{\underset{Me}{|}}{\overset{\overset{Me}{|}}{Si}}—(CH_2)_3\right]_2—Y^4$ (H′)

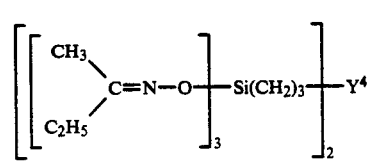
$\left[\left[\begin{array}{c}CH_3\\ \diagdown \\ C=N—O \\ \diagup \\ C_2H_5\end{array}\right]_3—Si(CH_2)_3\right]_2—Y^4$ (I′)

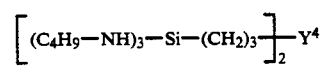
$\left[(C_4H_9—NH)_3—Si—(CH_2)_3\right]_2—Y^4$ (J′)

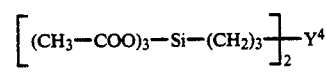
$\left[(CH_3—COO)_3—Si—(CH_2)_3\right]_2—Y^4$ (K′)

Monomer

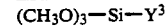
$(CH_3O)_3—Si—Y^3$ (A)

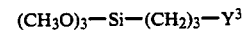
$(CH_3O)_3—Si—(CH_2)_3—Y^3$ (B)

$(CH_3—CH_2O)_3—Y^3$ (C)

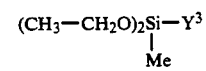
$(CH_3—CH_2O)_2\underset{Me}{Si}—Y^3$ (D)

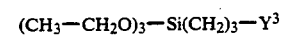
$(CH_3—CH_2O)_3—Si(CH_2)_3—Y^3$ (E)

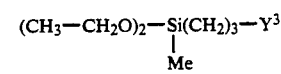
$(CH_3—CH_2O)_2—\underset{Me}{Si}(CH_2)_3—Y^3$ (F)

$(CH_3O)_2—Si—(CH_2)_3—Y^3$ (G)

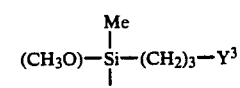
$(CH_3O)—\underset{\underset{Me}{|}}{\overset{\overset{Me}{|}}{Si}}—(CH_2)_3—Y^3$ (H)

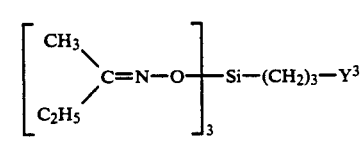
$\left[\begin{array}{c}CH_3\\ \diagdown \\ C=N—O \\ \diagup \\ C_2H_5\end{array}\right]_3—Si—(CH_2)_3—Y^3$ (I)

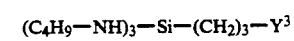
$(C_4H_9—NH)_3—Si—(CH_2)_3—Y^3$ (J)

$(CH_3—COO)_3—Si—(CH_2)_3—Y^3$ (K)

in which formulae M is a —$CH_3$ (methyl) group, $Y^3$ is a 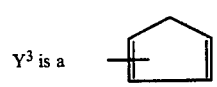 (cyclopentadienyl) group, and -continued Y⁴ is a 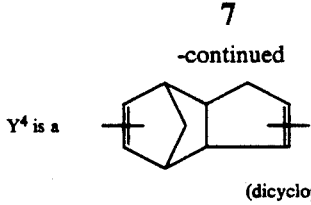

(dicyclopentadienylene) group.

The silanes of formula (5) may be prepared as described in U.S. Pat. No. 4,645,850, while the silanes of formula (5') are prepared by the partial or total dimerization of the silane of formula (5).

Exemplary silanes of formula (5") are those having the formulae:

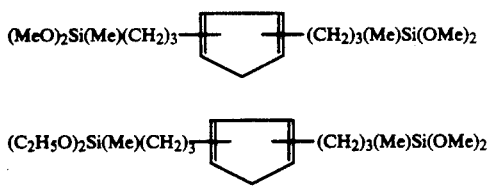

The polyorganosiloxane resins having at least two hydroxyl groups which are used are preferably liquids and are well known to the silicone art. They contain T and/or Q units (at least 30% by weight) with M and D units, the definitions of T, Q, D and M also being well known to the art of silicones and set forth at page 3 of NOLL, *Chemistry and Technology of Silicones*.

The polydiorganosiloxane oils having terminal hydroxyl groups are straight chain polydiorganosiloxanes having the formula:

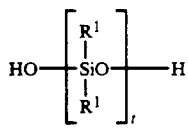

(7)

in which t ranges from 5 to 1,000, inclusive, and $R^1$ is as defined above.

Thus, the polysiloxanes prepared by reaction of a silane of formula (5') with an α,ω-dihydroxypolydiorganosiloxane oil according to formula (7) correspond to the polyorganosiloxanes of formula (3') described above.

The polysiloxanes prepared by reaction of a silane of formula (5), in which i=1 and h=2, with an α,ω-dihydroxypolydiorganosiloxane oil according to formula (7), correspond to those having the formula:

(3''')

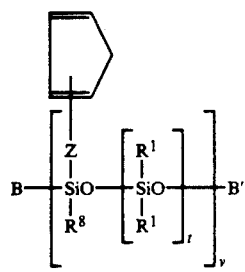

in which B is a radical $R^8$ corresponding either to a radical $R^1$ or to a radical X, the definitions of which are given above, and

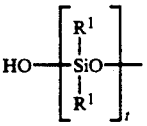

B' is a hydrogen atom, optionally replaced by group $R^{13}Si—$, and

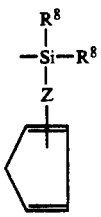

t ranges from 5 to 1,000, inclusive and v ranges from 1 to 200, inclusive, and preferably from 2 to 200 if B' is a hydrogen atom, optionally replaced by a group $R^{13}Si$.

The polysiloxanes prepared by reacting a silane of formula (5") with an α,ω-dihydroxypolydiorganosiloxane oil according to formula (7) correspond to those having the formula:

(3'''')

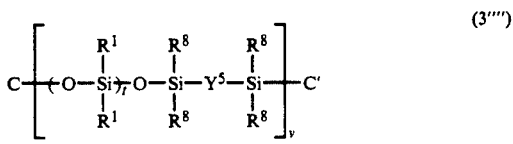

in which $Y^5$ is a group

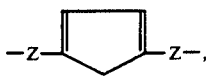

the definitions of Z being as above; $R^1$ and $R^8$ are as defined above; C is a hydrogen atom, optionally replaced by a group $R^{13}Si—$, or a radical:

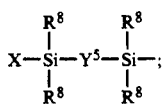

C' is a radical X, as defined above, or a radical:

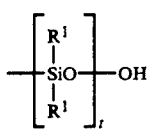

in which the hydrogen atom of the hydroxyl group may optionally be replaced by a group $R^{13}Si—$; t is a number ranging from 5 to 1,000, inclusive; and v is a number ranging from 1 to 200, inclusive, and from 2 to 200 if C is a hydrogen atom optionally replaced by $R^{13}Si$.

The present invention also features a polyorganosiloxane composition which is stable on storage in the absence of moisture and/or oxygen and which can be crosslinked to form an elastomer by exposure at ambient temperature (and, if necessary, with heating) to atmospheric humidity and/or atmospheric oxygen.

Such polyorganosiloxane compositions comprise:
(1) 100 parts of at least one polydiorganosiloxane selected from among the aforesaid species containing at least one siloxy structural unit of formulae (1), (1') or (2), or represented by the average formula (3), (3'), (3''), (3'''), (3'''') or (4),
(2) a catalytically effective amount of a metal curing catalyst, and
(3) 0 to 250 parts of at lest one inorganic filler material.

Particularly exemplary curing catalysts (2) include monocarboxylic acid salts of metals such as barium, bismuth, calcium, cerium, cobalt, chromium, copper, iron, lead, magnesium, manganese, nickel, the rare earths, tin, zinc and zirconium. Other organic ligands may be bonded to the metals, such as chelated (acetylacetonate) and carbonyl ligands. The preferred catalysts are the monocarboxylic acid salts of cobalt, iron and manganese, in particular cobalt 2-ethylhexanoate and, more particularly, dibutyltin dilaurate or dibutyltin diacetylacetonate.

By the term "catalytically effective amount of catalyst" (2) is intended an amount sufficient to ensure suitable crosslinking. Amounts of from 0.01 to 5 parts, preferably from 0.1 to 3 parts, by weight of metal salt per 100 parts of polysiloxane (1) are typically suitable.

The subject compositions may also contain a drying agent selected, for example, from among the alkali metal oxides and alkaline earth metal oxides.

It is advantageous to incorporate 0.1 to 5 parts of drying agents per 100 parts of polysiloxane (1).

With a view to reducing the setting time, it is also advantageous to add a redox agent of the iron oxide or copper sulfate type, or the like, for example in an amount of 0.1 to 3 parts per 100 parts of oil (1).

The inorganic fillers (3) are incorporated in an amount of 0 to 250 parts, preferably 20 to 200 parts, per 100 parts of polymer (1).

These fillers may be in the form of very finely divided materials, the average particle diameter of which is less than 0.1 micrometer. These fillers include pyrogenic silicas and precipitation silicas; their BET specific surface area is generally greater than 40 m²/g.

The fillers may also be in the form of more coarsely divided materials having an average particle diameter of greater than 0.1 micrometer. Exemplary fillers of this type include ground quartz, diatromaceous silicas, calcium carbonate, calcined clay, titanium dioxide of the rutile type, iron, zinc, chromium, zirconium and magnesium oxides, the various forms of alumina (hydrated or unhydrated), boron nitride, lithopone, barium metaborate, barium sulfate and glass microspheres; their specific surface area is generally less than 30 m²/g.

These fillers (3) may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysiloxanes (see French Patents FR-A-1,126,884, FR-A-1,136,885 and FR-A-1,236,505; British Patent GB-A-1,247,234). In the majority of cases, the treated fillers contain from 3% to 30% of their weight of organosilicon compounds.

The fillers (3) may be a mixture of several types of fillers of different particle size; thus, for example, they may comprise 5% to 95% of finely divided silicas having a BET specific surface area greater than 40 m²/g and 95% to 5% of more coarsely divided silicas having a specific surface area of less than 30 m²/g, or treated or untreated calcium carbonate.

In an advantageous embodiment of the invention, it is also possible to incorporate a diorganopolysiloxane oil (4) in the elastomer composition, which oil is not reactive in the composition and has the formula:

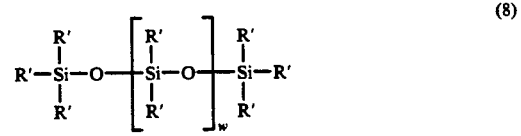

in which R' is a straight or branched chain alkyl radical having from 1 to 12 carbon atoms or a phenyl radical optionally substituted by one or more lower alkyl radicals; preferably, R' is a methyl and/or phenyl radical, and w is an integer or fraction selected such that the polymer of formula (8) has a viscosity of 25° C. of less than 100,000 mPa.s and preferably ranging from 50 to 10,000 mPa.s.

When an oil (4) of formula (IX) is incorporated, the amount employed represents 1 to 30 parts of oil per 100 part of polymer (1).

In another advantageous embodiment of the invention, an adherence agent (5) may be added in an amount of 0 to 20 parts, preferably 0.2 to 10 parts, per 100 parts of polysiloxane (1).

This agent is selected from among the organosilicon compounds bearing, at the same time, on the one hand organic groups substituted by radicals selected from among amino, ureido, isocyanato, epoxy, alkenyl, isocyanurate, hydantoyl and mercapto-ester radicals and, on the other, hydrolyzable groups bonded to the silcon atoms. The organosilicon compounds corresponding to the following formulae:

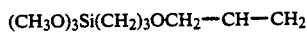

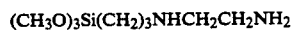

are exemplary.

The compositions according to the invention may also contain the usual adjuvants or additives typically included in silicone elastomer compositions and well known to this art.

Particularly exemplary adjuvants are the organic plasticizers. The plasticizers described in U.S. Pat. No. 4,525,565 are especially representative.

Other such adjuvants or additives include, in particular, colorants, heat stabilizers, antioxidants, fluidizing agents, thixotropic agents, perfumes, and the like.

The compositions according to the present invention can be cured solely under the action of atmospheric oxygen, if the polyorganosiloxanes (1) employed do not contain hydrolyzable groups X, or can be cured under the action of atmospheric humidity and/or atmospheric oxygen if they contain hydrolyzable groups X.

In order to formulate the compositions according to the invention, it is necessary to use equipment which permits intimate mixing of the various fundamental constituents, to which the abovementioned adjuvants and additives are optionally added, in the absence of moisture and/or gaseous oxygen and preferably without application of heat.

A more particularly preferred technique is that which comprises introducing the ingredients into a mixer, at ambient temperature and in the absence of moisture and/or atmospheric oxygen, in the following sequence: the oil (1), where appropriate the oil (4), where appropriate the plasticizer, the catalyst (2) and then, where appropriate, the drying agent and finally the filler (3), where appropriate with the adherence agent (5).

A degassing is then preferably carried out under a reduced pressure of, for example, from 0.01 to 10 KPa.

The compositions according to the invention are stable on storage, in the absence of moisture and/or gaseous oxygen, for a period of time of at least 6 months and even one year and may be used, in particular, for pointing in the construction industry, the assembly of very diverse materials (metals, plastic materials, natural and synthetic rubbers, wood, cardboard, tiles, brick, ceramics, glass, stone, concrete and brickwork elements), the insulation of electrical conductors, sheathing electronic circuits and the preparation of molds used for the production of articles shaped from synthetic resins or foams.

The compositions according to the invention may, if appropriate, be used after dilution in liquid organic compounds; the diluents are preferably customary commercial products selected from among:

(i) halogenated or non-halogenated aliphatic, cycloaliphatic or aromatic hydrocarbons, such as cyclohexane, and toluene, (ii) aliphatic and cycloaliphatic ketones, such as methyl ethyl ketone, and (iii) esters, such as ethyl acetate.

The amount of diluent, in general, remains fairly low; it is typically less than 50% by weight with respect to the total weight of the composition.

The aforesaid dilutions of these compositions in organic diluents may be used, more particularly, for the thin-layer impregnation of woven or nonwoven articles and coating of sheets made of metal or of plastic or cellulose material; however, they may be sprayed, for example by atomization using a paint spray gun, on any substrate for which it is necessary to provide a coating having a thickness on the order of 5 to 300 μm. After spraying the dilutions, the diluents evaporate and the "dried" compositions cure to form a perfectly uniform rubbery film.

Moreover, this elastomer film may serve as non-toxic, inert non-stick coating on diverse substrates in contact with foodstuffs, such as (a) papers for packing confectionery or frozen meat, (b) metal vessels which can be used for the preparation of ice creams and sorbets and (c) metal tins in which bread dough is placed and shaped and which are introduced with their contents into the ovens for baking bead. It may also be used as a non-stick and non-toxic coating for materials in contact with the human body, such as compresses and special dressings for burns.

It will be appreciated that the compositions according to the invention can be crosslinked into elastomeric state either by exposing the silicone composition to heat or by exposing the composition to ultraviolet radiation.

In order to further illustrate the present invention and the advantages thereof, the following specific examples are given, it being understood that same are intended only as illustrative and in nowise limitative.

In said examples to follow, as in the foregoing text, all parts and percentages are given by weight, unless otherwise indicated.

In the formulae set forth in the examples, Me denotes a methyl radical.

The mechanical properties of elastomer compositions stored in an aluminum tube which was tight to atmospheric humidity and atmospheric oxygen were evaluated in the following manner:

(1) the contents of a tube were spread in the form of a thin layer, in the open air, on a support plate, and (2) the time (ts) required for a skin to form on the surface of the film and the delamination time (tl) required to pull the elastomer off the plate were determined.

The layer deposited was converted into a rubbery film; the elastomer film was removed as soon as it could be delaminated and, after aging for x days at ambient temperature, the dynamometric properties of the elastomers were determined, namely:

(a) the SHORE A hardness (SAH) in accordance with the standard NF-T-51 109
(b) the tear strength (TS) in MPa in accordance with the standard NF-T-46 992
(c) the elongation at break (EB) in % in accordance with the standard NF-T-46 002
(d) the modulus (M) in MPa for an elongation of 100% after aging for x days

EXAMPLE 1

The following materials were introduced into a flat-bottomed reactor which had a capacity of 500 cm³ and which was provided with a three-blade stirrer and a heating and cooling system:

(i) 300 g of an α,ω-dihydroxypolydimethylsiloxane (PDMS) oil having the average formula:

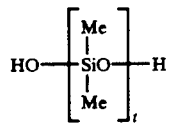

the number-average molecular weight of which was 38,500 and the viscosity of which was 20,000 mPa.s at 25° C., where t is≃519, which corresponded to 15.6 mmoles of OH, and (ii) 14.55 g of γ-cyclopentadienylpropyltriethoxysilane dimer, or 26.9 mmoles of the product E' described above, this product being marketed byu DEGUSSA, reference (Si 260).

The mixture was stirred for one hour at 25° C. under an inert nitrogen atmosphere. The viscosity of the residual silanols evidenced that there has been no disappearance of the latter. Functionalization, therefore, had not occurred.

EXAMPLE 2

The procedure of Example 1 was repeated, except that the oil/silane mixture was heated under nitrogen at 80° C. before initiating the functionalization reaction by introduction of 1.44 g of a methanolic lithium hydroxide solution containing 2.85 mmoles of LiOH serving as catalyst. Heating was continued for an additional hour at 80° C. and a neutralizing solution of phosphoric acid was then poured therein and the mixture was maintained at 80° C. for an additional 10 minutes. It was then cooled to 20° C. and a functionalized oil was recovered which no longer contained silanol groups and had a viscosity of 70,000 mPa.s.

The oil obtained had the formula:

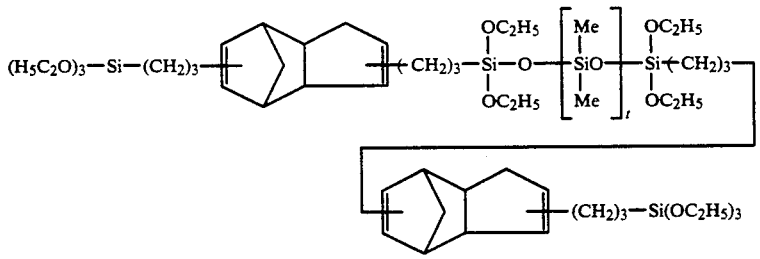

and corresponded to a polysiloxane according to the present invention, of general formula (3'),

EXAMPLES 3, 4 AND 5

Elastomer compositions were produced from the oil obtained in Example 2 and these compositions crosslinked on exposure to atmospheric humidity and atmospheric oxygen.

These compositions were formulated by mixing the following materials, successively, in the flat-bottomed reactor described above, at 25° C., with stirring and under an inert nitrogen atmosphere:
 (i) 100 parts of functionalized oil,
 (ii) 10 parts of α,ω-trimethylsilyl-PDMS oil having a viscosity of 100 mPa.s,
 (iii) 0.1 part of crosslinking catalyst,
 (iv) n* parts of an aminosilane of the formula:

$(C_2H_5O)_3$—Si—$(CH_2)_2$—NH—$(CH_2)_2$—$NH_2$, as an adherence promoter, and
 (v) 8 parts of a pyrogenic silica having a specific surface area of 150 m²/g.

The compositions obtained were stored for 48 hours or 3 months in a cartridge which was tight to atmospheric humidity and atmospheric oxygen before being extruded and then spread into elastomer films, the dynamometric properties of which were determined over the course of crosslinking. The thickness of the films was 2 mm.

The results obtained are reported in the following Table I:

TABLE I

| | EXAMPLE 3 | | EXAMPLE 4 | | EXAMPLE 5 | |
|---|---|---|---|---|---|---|
| | 48 h | 3 months | 48 h | 3 months | 48 h | 3 months |
| STORAGE | | | | | | |
| CATALYST | Sn/Co | Sn/Co | Sn | Sn | Co | Co |
| AMINOSILANE (parts) | 3.3 | 3.3 | 0 | 0 | 0 | 0 |
| APPEARANCE | SALMON | | IVORY | | SALMON | |
| tsf (min) | 30 | 30 | 5 | 37 | 5 | |
| DELAMINATION (hours) | 24 | 24 | 24 | 24 | not crosslinked after 7 days | |
| SHORE A HARDNESS | | | | | | |
| 2 days | 6 | 7 | 8 | 13 | 0 | |
| 7 days | 11 | 14 | 15 | 18 | 0 | |
| STRENGTH (MPa), tear | 0.8 | 0.8 | 0.8 | 0.8 | 0 | |
| ELONGATION (%) at break | 240 | 216 | 205 | 213 | 0 | |
| MODULUS at 100% | 0.3 | 0.4 | 0.5 | 0.6 | 0 | |

AMINOSILANE = $(C_2H_5O)_3Si$—$(CH_3$—$NHO(CH_2)_2$—$NH_2$
Sn = Dibutyltin bisacetylacetonate
Co = Cobalt octoate containing 6% of cobalt, 1 part
tsf = Time required for skin formation

EXAMPLE 6

Polymerizatin of Siloxane Oligomers In Accordance With U.S. Pat. No. 4,508,845

115 g of porous silica microspheres, designated Spherosil, grafted with sulfonated polystyrene and having H+ catalytic sites (0.6 meq/g) were introduced into a cylindrical reactor which had a diameter of 4 cm and a length of 20 cm and, therefore, a capacity of 250 cm³. The particle size of the spheres was 100 to 200 microns. The system was provided with a heating jacket and a probe enabling the temperature in the core of the reactor to be measured.

The reactor was connected to a pump for continuous feeding of the reagents, i.e., a mixture comprising:

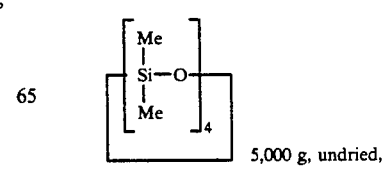

5,000 g, undried,

-continued

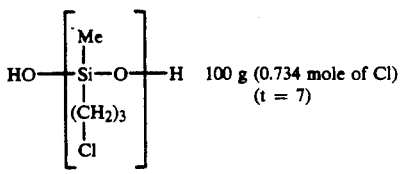   100 g (0.734 mole of Cl)
(t = 7)

Me₃Si)₂O   12.9 g

The theoretical proportion of chlorine was 0.5%.

The composition was heated to 84° C. and feeding of the reactor was commenced at a rate of 2 ml/min.

After 20 minutes under the operating conditions, the relative pressure was 5 bars and withdrawl of the reaction product was initiated. After 24 hours, the reaction was stopped and 3,000 g of product containing 10% of volatile matter were devolatilized. $^{29}$Si and $^1$H NMR analyses, gel permeation chromatography and determination of the Cl groups present confirmed that an oil having the average formula:

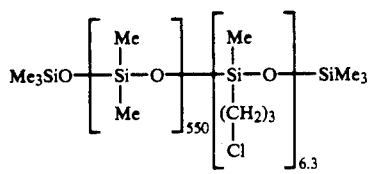

Mn = 42,000

15 meq Cl/100 g designated (HU6) below, (Mn=number-average molecular weight), had been obtained.

EXAMPLE 7

512 parts of the oil (HU6) of Example 6 were introduced into a 2-liter glass reactor provided with a central stirring system and a twin-jacket cooling or heating system.

Under an argon atmosphere, 38.44 cc of a 2 mole/liter solution of cyclopentadienyl-sodium (76.8 meq of cyclpentadienyl anion) in tetrahydrofuran were introduced over a period of 30 minutes at a temperature of less than 30° C. After stirring for 24 hours at ambient temperature and under argon, the salt formed was removed by filtering the oil through a cellulose plate (EUROFILTEC filter).

300 parts of oil were recovered and this was then freed from residual tetrahydrofuran.

$^1$H NMR analysis of the reaction product evidenced that an oil having the average formula:

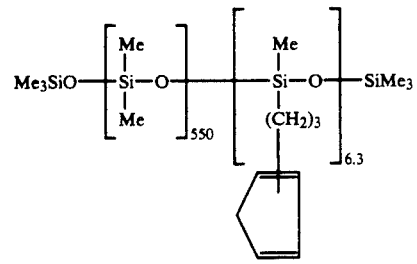

Mn=45,000, was obtained.

The oil was stored in the absence of air and is designated (HU 7) below

EXAMPLE 8

Preparation of   (MeO)₂—Si—(CH₂)₃—
                        |
                        Me in accordance with U.S. Pat. No. 4,704,428 and U.S. Pat. No. 4,645,850:

292 g of γ-chloropropylmethyldimethoxysilane were introduced, under nitrogen, into a 2-liter round-bottomed flask provided with a mechanical stirrer and a vertical condenser. 800 ml of a 2 mole/liter solution of cyclopentadienyl-sodium NaCp anion in tetrahydrofuran were introduced at 0° C., maintaining the mixture at this temperature. All of the solution had been introduced after 1 hour. The reaction mixture was maintained at 5° C. for 2 hours. After a reaction time of 2 hours, a degree of conversion of the γ-chloropropylmethyldimethoxysilane of 80% was attained (vapor phase chromatography). The reaction mixture was permitted to warm to ambient temperature and the degree of conversion of the γ-chloropropylmethyldimethoxysilane was greater than 98% after a reaction time of 10 hours. The reaction mixture was filtered under argon in order to remove the sodium chloride formed and the tetrahydrofuran was evaporated at 20° C. under an absolute pressure of 1 mm Hg (weight obtained: 325 g).

The expected product constituted 75% of the crude reaction product.

About 20% of the crude reaction product had the formula:

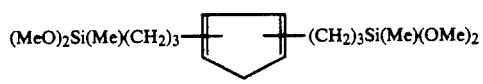

$^1$H NMR of the expected product indicated two isomers present, i.e.:

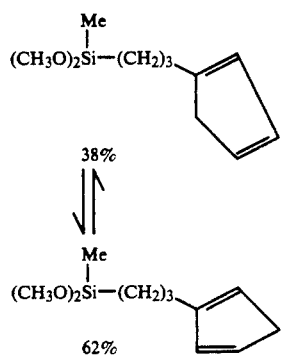

Distillation of the crude reaction product at 60° C. under 0.7 mm Hg (absolute pressure) provided 180 g of a pale yellow product.

$^1$H NMR analysis evidenced that a mixture of:

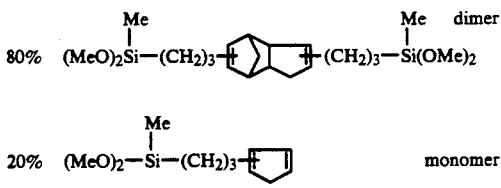

80% (MeO)$_2$Si—(CH$_2$)$_3$—[bicyclic]—(CH$_2$)$_3$—Si(OMe)$_2$  Me  dimer

20% (MeO)$_2$—Si—(CH$_2$)$_3$—[cyclic]  monomer was obtained.

If the distillate was trapped at low temperature ($\theta < 0°$ C.), only the monomer product was obtained.

EXAMPLE 9

The following materials were respectively introduced into a flat-bottomed reactor which had a capacity of 2 liters and was provided with a three-blade stirrer and a heating and cooling system:

(1) at 25° C., under argon:

541 g of an oil having the average formula:

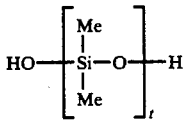

$$HO \left[ \begin{array}{c} Me \\ | \\ Si-O \\ | \\ Me \end{array} \right]_t H$$

Mn≃26,700, t≃360, viscosity=5,000 mPa.s at 25° C., equivalent to 40.5 meq OH;

(2) at 25° C., under argon: 10 g of the silane prepared in Example 8, equivalent to 94 meq OMe. The mixture was then heated to 90° C.;

(3) at 90° C., under argon: 20 g of a paste formed from 90 parts of an α,ω-dihydroxypolydimethylsiloxane oil having a viscosity of 10,000 mPa.s at 25° C., 5 parts of a pyrogenic silica having a specific surface area of 150 m$^2$/g and 5 parts of water (or 55 meq H$_2$O);

(4) at 90° C.: 0.5 g of a tin-based catalyst of the formula:

Bu$_2$Sn(Acac)$_2$ where

Acac = CH$_3$C—CH—C—CH$_3$ = acetylacetonate

Bu = butyl

The mixture was stirred for 2 hours, 15 minutes, under argon at 90° C. and the methanol formed was then removed under an absolute pressure of 1 mm Hg at 90° C. The viscosity of the oil obtained at 25° C. was 12,000 mPa.s and the average molecular weight of the oil was about 40,000. This oil will be designated HU9 below.

EXAMPLE 10

1 part of cobalt octoate and 1 part of zirconium octoate and also 8 parts of 150 m$^2$/g pyrogenic silica were added to 100 parts of oils HU7 and 9. The mixtures were prepared in the absence of air.

The times required for a skin to form, during crosslinking in air, were a few hours and the elastomers obtained could be delaminated after a crosslinking time of 72 hours.

SAH 7 days HU7=6.
SAH 7 days HU9=10.

EXAMPLE 11

The following materials were respectively introduced at 200° C. under argon, into the same reactor as described in Example 9:

(i) 734 g of an oil having the average

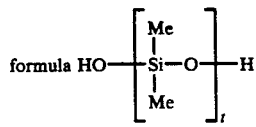

formula $HO \left[ \begin{array}{c} Me \\ | \\ Si-O \\ | \\ Me \end{array} \right]_t H$ Mn≃38,500, t=520, n=20,000 mPa.s at 25° C., equivalent to 38 meq OH;

(ii) 14.7 g of a silane prepared in Example 8: equivalent to 138 meq OMe. The mixture was then heated to 90° C. under argon;

(iii) 20 g of a paste formed from 90 parts of an α,ω-dihydroxypolydimethylsiloxane oil having a viscosity of 10,000 mPa.s at 25° C., 5 parts of a pyrogenic silica having a specific surface area of 150 m$^2$/g and 5 parts of water (or 55 meq H$_2$O);

(iv) at 90° C., 0.5 g of a tin-based catalyst of the formula:

Bu$_2$Sn(Acac)$_2$ where

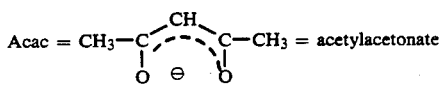

Acac = CH$_3$—C—CH—C—CH$_3$ = acetylacetonate

Bu = butyl

The mixture was stirred for an additional 1 hour at 90° C. and the methanol formed was then removed under an absolute pressure of 1 mm Hg at 90° C. for 2 hours.

The viscosity of the oil obtained at 25° C. was 35,000 mPa.s (HUII).

EXAMPLES 12 AND 13

Elastomer compositions were prepared from oil (HUII).

These compositions crosslinked in the presence of atmospheric humidity and atmospheric oxygen.

These compositions were obtained by mixing the following constituents, by weight, in a flat-bottomed reactor which had a capacity of 2 liters, with stirring and under an inert atmosphere:

(i) 100 parts of oil (HU11),
(ii) x parts of silane as described in Example 8,
(iii) y parts of 10% cobalt octoate,
(iv) z parts of 18% zirconium octoate,
(v) n parts of dibutyltin diacetylacetonate,
(vi) 100 parts of calcium carbonate CaCO$_3$, and
(viii) 9 parts of pyrogenic silica having a specific surface area of 150 m$^2$/g.

The compositions obtained were stored for 48 hours in a cartridge which was tight to moisture and to atmospheric oxygen before being extruded and then spread to form elastomer films, the dynamometric properties of which were determined during crosslinking.

The thickness of the films was 2 mm.

The results obtained are reported in the following Table II:

TABLE II

| | EXAMPLE 12 | EXAMPLE 13 |
|---|---|---|
| STORAGE | 48 hours | 48 hours |
| x | 0 | 3.8 |
| y | 0.59 | 0.23 |
| z | 0.5 | 0.24 |
| n | 0 | 0.12 |
| Appearance | Ivory | Ivory |
| tsf (min) | 10 | 5 |
| Delamination (days) | >7 days | 4 |
| Shore A hardness | | |
| 7 days | — | 5 |
| 14 days | — | 20 |
| Tear strength (MPa) 7 days | — | 0.6 |
| Elongation at break (%) 7 days | — | 220 |
| Modulus at 100% | — | 0.4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polyorganosiloxane polymer comprising a polysiloxane ($P_1$) having, per molecule, at least one structural unit of the formula:

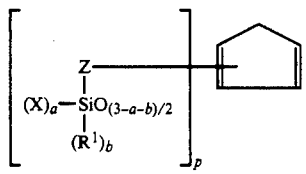

(1)

and/or a polysiloxane ($P_2$) having, per molecule, at least one structural unit of the formula:

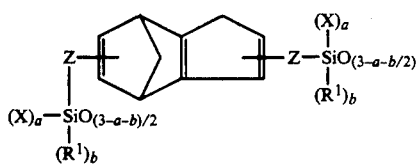

(1')

in which formulae the radicals X, which may be identical or different, are each a hydrolyzable halogen atom, N-substituted amino, N-substituted amido, N,N-disubstituted amino, ketiminoxy, aldiminoxy, alkoxy, acyloxy, enoxy or alkoxyalkyleneoxy radical; the radicals $R^1$, which may be identical or different, are each a monovalent hydrocarbon radical having from 1 to 10 carbon atoms or a monovalent hydrocarbon radical having from 1 to 10 carbon atoms substitued by halogen atoms or cyano groups; Z is a straight or branched chain divalent saturated hydrocarbon radical having from 1 to 10 carbon atoms; a is zero, 1 or 2; b is zero, 1 or 2; a+b is at most 2; and p is 1 or 2, with the proviso that said polysiloxane ($P_1$) has, per molecule, at least one structural unit (1) if a is other than zero and at least two structural units (1) if a is zero.

2. The polyorganosiloxane polymer as defined by claim 1, said polysiloxane (1) and/or (1') further comprising siloxyl structural units of the formula:

$$(R^1)_c SiO_{(4-c)/2} \quad (2)$$

in which c is zero, 1, 2 or 3.

3. The polyorganosiloxane polymer as defined by claim 1, comprising a random, sequenced or block diorganopolysiloxane copolymer having the average formula:

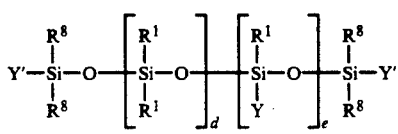

(3)

in which Y is a radical

$Y'$ is Y, $R^1$ or a hydroxyl radical; $R^8$ is a radical $R'$ or a radical X; d is a number ranging from 0 to 1,000; and e is an integer ranging from 0 to 50, with the proviso that, if e=0, the two radicals $Y'$ are Y radicals or radicals of the formula:

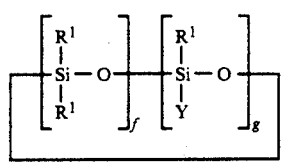

(4)

in which f is an integer ranging from 0 to 9, inclusive; g is an integer ranging from 1 to 9, inclusive; and f+g ranges from 3 to 10, inclusive.

4. The polyorganosiloxane polymer as defined by claim 1, comprising a polysiloxane of the formula:

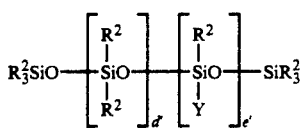

(3'')

in which Y is a radical

the radicals $R^2$, which may be identical or different, are each a monovalent hydrocarbon radical having from 1 to 10 carbon atoms; d is a number ranging from 10 to 1,000; and e' is a number ranging from 2 to 50.

5. The polyorganosiloxane polymer as defined by claim 1, comprising a polysiloxane having the formula:

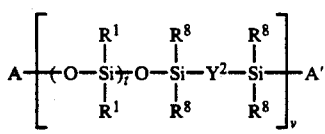 (3')

in which $Y^2$ is a radical

$R^8$ is a radical $R^1$ or a radical X; A is a hydrogen atom or a radical $R^{13}Si-$, or a radical

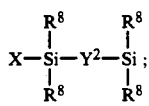

A' is a radical X or a radical of the formula:

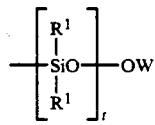

in which W is hydrogen or a radical $R^{13}Si-$; t is a number ranging from 5 to 1,000, inclusive; and v is a number ranging from 1 to 200, inclusive, and from 2 to 200 if A is a hydrogen atom or a radical $R^{13}Si-$; and/or a polysiloxane having the formula:

(3''')

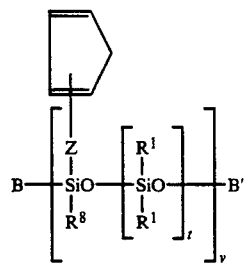

in which B is a radical $R^8$ or a radical of the formula:

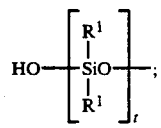

B' is a hydrogen atom, a radical $R^{13}Si-$, or a radical of the formula:

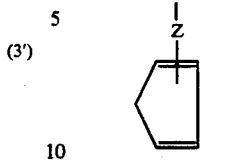

t is a number ranging from 5 to 1,000, inclusive; and v is a number ranging from 1 to 200, inclusive, with the proviso that v ranges from 2 to 200 if B' is a hydrogen atom or a radical $R^{13}Si$; and/or a polysiloxane having the formula:

(3'''')

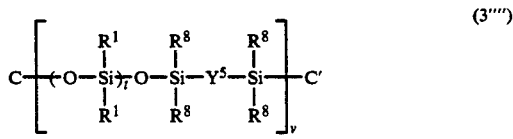

in which $Y^5$ is a radical

C is a hydrogen atom, a radical $R^{13}Si-$, or a radical of the formula:

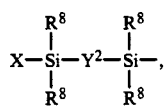

and C' is a radical X, or a radical of the formula:

in which W' is hydrogen or a radical $R^{13}Si-$; t is a number ranging from 5 to 1,000, inclusive, and v is a number ranging from 1 to 200, inclusive, with the proviso that v ranges from 2 to 200 if C is a hydrogen atom, or a radical $R^{13}Si-$.

6. A process for the preparation of a polysiloxane ($P_1$) having, per molecule, at least one structural unit of the formula:

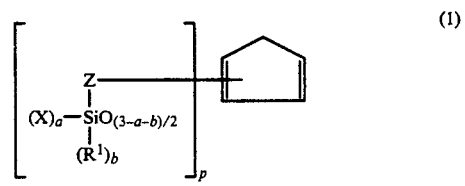 (1)

and/or a polysiloxane ($P_2$) having, per molecule, at least one structural unit of the formula:

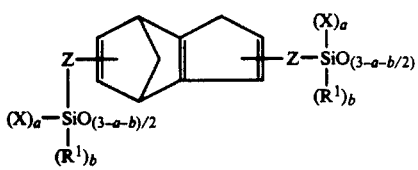 (1')

in which formulae the radicals X, which may be identical or different, are each a hydrolyzable halogen atom, N-substituted amino, N-substituted amido, N,N-disubstituted amino, ketiminoxy, aldiminoxy, alkoxy, acyloxy, enoxy or alkoxyalkyleneoxy radical; the radicals $R^1$, which may be identical or different, are each a monovalent hydrocarbon radical having from 1 to 10 carbon atoms or a monovalent hydrocarbon radical having from 1 to 10 carbon atoms substituted by halogen atoms or cyano groups; Z is a straight or branched chain divalent saturated hydrocarbon radical having from 1 to 10 carbon atoms; a is zero, 1 or 2; b is zero, 1 or 2; a+b is at most 2; and p is 1 or 2, with the proviso that said polysiloxane ($P_1$) has, per molecule, at least one structural unit (1) if a is other than zero and at least two structural units (1) if a is zero, comprising reacting a straight-chain polydiorganosiloxane having the formula:

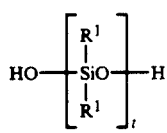

in which t is a number ranging from 5 to 1,000, inclusive, with at least one silane of the formula:

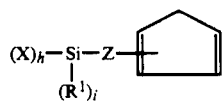 (5)

and/or a silane of the formula:

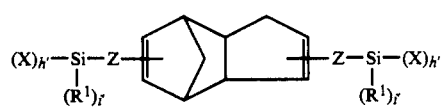 (5')

and/or a silane of the formula:

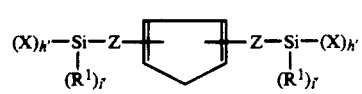 (5'')

in which formulae h is 2 or 3; i is zero or 1; h+i=3; i' is zero, 1 or 2; h' is 1, 2 or 3; i'+h'=3; j is zero, 1, 2 or 3; k is 1, 2, 3 or 4; and j+k=4.

7. A polyorganosiloxane composition which is stable on storage in the absence of moisture and/or gaseous oxygen but which is crosslinkable into elastomeric state by means of atmospheric humidity and/or atmospheric oxygen, comprising, by weight:
1. 100 parts of at least one polyorganosiloxane polymer comprising a polysiloxane ($P_1$) having, per molecule, at least one structural unit of the formula:

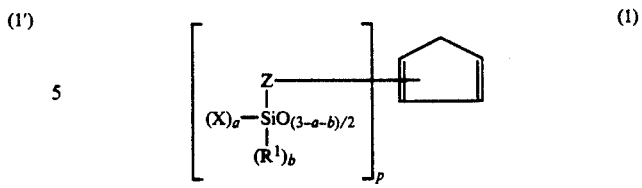 (1)

and/or a polysiloxane ($P_2$) having, per molecule, at least one structural unit of the formula:

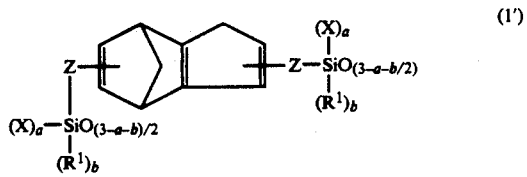 (1')

in which formulae the radicals X, which may be identical or different, are each a hydrolyzable halogen atom, N-substituted amino, N-substituted amido, N,N-disubstituted amino, ketiminoxy, aldiminoxy, alkoxy, acyloxy, enoxy or alkoxyalkyleneoxy radical; the radicals $R^1$, which may be identical or different, are each a monovalent hydrocarbon radical having from 1 to 10 carbon atoms or a monovalent hydrocarbon radical having from 1 to 10 carbon atoms substituted by halogen atoms or cyano groups; Z is a straight or branched chain divalent saturated hydrocarbon radical having from 1 to 10 carbon atoms; a is zero, 1 or 2; b is zero, 1 to 2; a+b is at most 2; and p is 1 or 2, with the proviso that said polysiloxane ($P_1$) has, per molecule, at least one structural unit (1) if a is other than zero and at least two structural units (1) if a is zero;
2. a catalytically effective amount of a metal curing catalyst; and
3. 0 to 250 parts of at least one inorganic filler material.

8. The polyorganosiloxane polymer comprising a polysiloxane ($P_1$) having, per molecule, at least one structural unit of the formula:

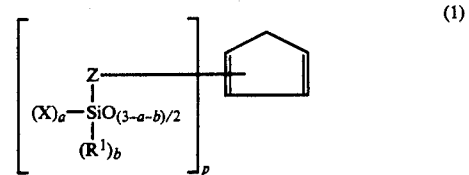 (1)

and/or a polysiloxane ($P_2$) having, per molecule, at least one structural unit of the formula:

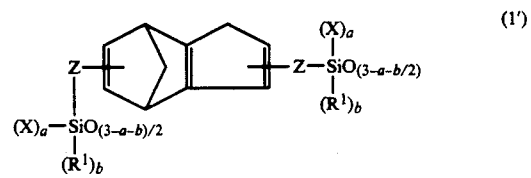 (1')

in which formulae the radicals X, which may be identical or different, are each a hydrolyzable halogen atom, N-substituted amino, N-substituted amido, N,N-disubstituted amino, ketiminoxy, aldiminoxy, alkoxy, acyloxy, enoxy or alkoxyalkyleneoxy radical; the radicals $R^1$, which may be identical or different, are each a monovalent hydrocarbon radical having from 1 to 10 carbon atoms or a monovalent hydrocarbon radical having from 1 to 10 carbon atoms substituted by halogen atoms or cyano groups; Z is a straight or branched chain divalent saturated hydrocarbon radical having from 1 to 10 carbon atoms; a is zero, 1 or 2; b is zero, 1 or 2; a+b is at most 2; and p is 1 or 2, with the proviso that said polysiloxane ($P_1$) has, per molecule, at least one structural unit (1) if a is other than zero and at least two structural units (1) if a is zero, said polyorganosiloxane being in a crosslinked state.

9. The polyorganosiloxane composition as defined by claim 7, further comprising, per 100 parts of polyorganosiloxane (1), from 1 to 30 parts of an unreactive polydiorganosiloxane oil of the formula:

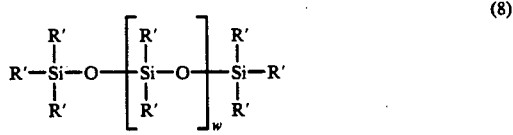

in which R' is a straight or branched chain alkyl radical having from 1 to 12 carbon atoms or a phenyl radical optionally substituted by at least one lower alkyl radical; w is an integer or fraction such that the polymer of formula (8) has a viscosity at 25° C. of less than 100,000 mPa.s; and/or 0.2 to 10 parts of an adherence agent.

* * * * *